United States Patent
Walz et al.

(10) Patent No.: US 8,863,889 B2
(45) Date of Patent: Oct. 21, 2014

(54) STEERING SYSTEM IN A VEHICLE

(71) Applicants: Stefan Walz, Schwaebisch Gmuend (DE); Thomas Poetzl, Winnenden (DE); Armin Lachenmaier, Rudersberg-Schlechtbach (DE)

(72) Inventors: Stefan Walz, Schwaebisch Gmuend (DE); Thomas Poetzl, Winnenden (DE); Armin Lachenmaier, Rudersberg-Schlechtbach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/658,241

(22) Filed: Oct. 23, 2012

(65) Prior Publication Data

US 2013/0153327 A1 Jun. 20, 2013

(30) Foreign Application Priority Data

Dec. 14, 2011 (DE) .......................... 10 2011 056 383

(51) Int. Cl.
*B62D 5/04* (2006.01)

(52) U.S. Cl.
CPC ............ *B62D 5/0403* (2013.01); *B62D 5/0406* (2013.01)
USPC .......................................... 180/444; 180/443

(58) Field of Classification Search
CPC ... B62D 5/0403; B62D 5/0406; B62D 5/0412
USPC ................................................. 180/444, 443
See application file for complete search history.

(56) References Cited

U.S. PATENT DOCUMENTS

| | | | |
|---|---|---|---|
| 3,817,115 A * | 6/1974 | Schnizler et al. | 74/417 |
| 4,603,865 A * | 8/1986 | Bien | 277/402 |
| 5,232,355 A * | 8/1993 | Fujii et al. | 418/55.2 |
| 6,183,208 B1 * | 2/2001 | Qandil et al. | 417/201 |
| 6,268,669 B1 * | 7/2001 | Wakao et al. | 310/67 R |
| 7,789,191 B2 * | 9/2010 | Deshmukh et al. | 180/444 |
| 7,921,958 B2 * | 4/2011 | Kang | 180/444 |
| 8,485,305 B2 * | 7/2013 | Nozaki et al. | 180/444 |
| 8,505,676 B2 * | 8/2013 | Yamamoto | 180/444 |
| 2004/0026158 A1 * | 2/2004 | Rieth et al. | 180/402 |
| 2012/0018242 A1 * | 1/2012 | Yamamoto | 180/444 |
| 2012/0313467 A1 * | 12/2012 | Omae et al. | 310/71 |

FOREIGN PATENT DOCUMENTS

| | | |
|---|---|---|
| DE | 197 82 297 | 9/2000 |
| DE | 20 2008 041 303 | 2/2010 |

* cited by examiner

*Primary Examiner* — Kevin Hurley
*Assistant Examiner* — Michael Stabley
(74) *Attorney, Agent, or Firm* — Jordan and Hamburg LLP

(57) ABSTRACT

A steering system in a vehicle comprises an electrical servo motor for generating a supporting servo torque, wherein the motor shaft of the servo motor is coupled to a motion-transmitting component of the steering system. A water protection shield enclosing the motor shaft is disposed between the motor housing of the servo motor and the motion-transmitting component.

7 Claims, 2 Drawing Sheets

STEERING SYSTEM IN A VEHICLE

BACKGROUND OF THE INVENTION

The invention relates to a steering system in a vehicle.

Electromechanical steering systems in vehicles are known that are equipped with an electrical servo motor so as to generate a servo torque supporting the steering motion. The servo motor is accommodated in a motor housing, generally on which a control device comprising a power electronics unit for controlling the servo motor is also disposed. The servo motor can, for example, be flange-mounted to the steering housing of the steering system, wherein the motion of the motor shaft of the servo motor is transmitted to a toothed rack in the housing via a suitable transmission member, such as a gearbox or a belt.

Such steering systems are subjected to various loads during driving operation. Possible risks include water or moisture damaging or disabling electrical components of the steering system.

SUMMARY OF THE INVENTION

It is the object of he invention to design a steering system, in a vehicle, that is equipped with an electrical servo motor, so that moisture-induced damage or failure is avoided even over long periods of operation, using simple design measures.

The steering system for a vehicle according to the invention is equipped with an electrical servo motor for generating a servo torque that supports the steering motion. The electrical servo motor can generally be disposed in various locations of the steering system and introduces the supporting torque in a component that is located in the kinematic transmission chain between the steering wheel and steerable wheels. The electrical servo motor can, for example, be disposed on the steering column and kinematically coupled thereto. According to a further advantageous embodiment, the electrical servo motor is disposed in the region of the housing of the steering system in which a toothed rack, which is driven by the steering column, is guided. The motor shaft of the electrical servo motor is kinematically coupled to the toothed rack so as to feed the supporting servo torque as desired into the steering system.

So as to prevent water or moisture from reaching the interior of the motor housing of the electrical servo motor, a water protection shield which encloses the motor shaft is disposed between the motor housing and the component transmitting the motion, to which the motor shaft is coupled so as to feed the servo torque into the steering system. The water protection shield extends preferably in a disk-shaped manner in all radial directions relative to the longitudinal motor shaft axis and thereby protects the facing motor housing end face from water penetration. In particular, water droplets, which can be transported by the motion-transmitting component in the direction of the motor shaft, can be prevented from penetrating axially along the motor shaft to the inlet into the motor housing during operation as a result of the motion of the motor shaft or of the motion-transmitting component to which the motor shaft is coupled. The water protection shield protects the end face of the motor housing, wherein the water protection shield can extend over the entire end face or merely over a portion of the motor housing end face. Any water that is introduced reaches the outer surface of the water protection shield and can flow off.

In general, a variety of alternative designs is conceivable for the water protection shield. According to a first embodiment, the water protection shield is designed as one piece and either non-rotatably disposed on the motor shaft or rigidly connected to a further component, notably the motor housing. The arrangement on the motor shaft has the advantage that liquid creepage axially along the motor shaft outside can be prevented by way of a fluid-tight connection of the water protection shield on the motor shaft. Arranging the water protection shield on the housing side has the advantage that this part of the protection shield does not have to be accelerated by the motor shaft.

According to a second advantageous embodiment, the water protection shield has a multi-piece, notably a two-piece, design, and comprises a component that is non-rotatably disposed on the motor shaft and a further component that is rigidly connected to the motor housing. The components of the water protection shield cooperate in the manner of a labyrinth seal, for example, in such a way that a collar extending in the radial direction is formed on one of the components, with a groove-shaped edge region of the second component of the water protection shield cooperating therewith fitting over the collar. Water moving axially toward the housing-side component of the water protection shield is collected on this component and can either dry or flow off along the outside.

The component on the motor shaft side preferably has a relatively low mass or a low moment of inertia, so as to minimize the additional energy expenditure for rotating the component seated on the motor shaft to an extent as great as possible. The component on the motor shaft side advantageously has a smaller radius than the component of the water protection shield on the motor housing side, which contributes to a reduction of the mass moment of inertia. The mass and moment of inertia can also be kept low by selecting a suitable material. It is advantageous, for example, to design at least one of the components, and optionally both components, as plastic parts or sheet metal parts. Optionally, a combination of a plastic part for the first component of the water protection shield and a metal part for the second component of the water protection shield can be used, wherein a plastic part can be used on the motor shaft side and a sheet metal part on the motor housing side, or conversely.

According to a further advantageous embodiment, the motor housing comprises a venting bore, notably on the end face, through which the motor shaft protrudes outward from the motor housing, wherein air can escape from the housing interior via the venting bore during the installation process of the servo motor, in particular in the event that a control electronics unit for controlling the servo motor is disposed on the motor housing, the unit being flange-mounted to the motor housing during installation. In order to prevent water from entering through the venting bore on the motor housing end face, the water protection shield advantageously extends in the radial direction so far that the venting bore is covered by the water protection shield. This allows the venting bore on the end face of the motor housing to be preserved, which results in advantages during installation. At the same time, it is ensured that no moisture can enter the housing interior or in the direction of the control electronics unit via the venting bore.

The motor shaft is coupled to the motion-transmitting component of the steering system, for example, by way of a transmission belt. While the transmission belt can transport water droplets in the direction of the motor shaft, these are precipitated on the water protection shield. The transmission belt connects the motor shaft to the steering column or to the toothed rack in the steering housing, for example.

However, it is also conceivable to couple the motor shaft to a gearbox, via which the motor shaft motion is introduced into a component of the steering system.

Further advantages and advantageous embodiments will be apparent from the remaining claims, the description of the figures, and the drawings.

DESCRIPTION OF THE PREFERRED EMBODIMENTS

Figure 1:
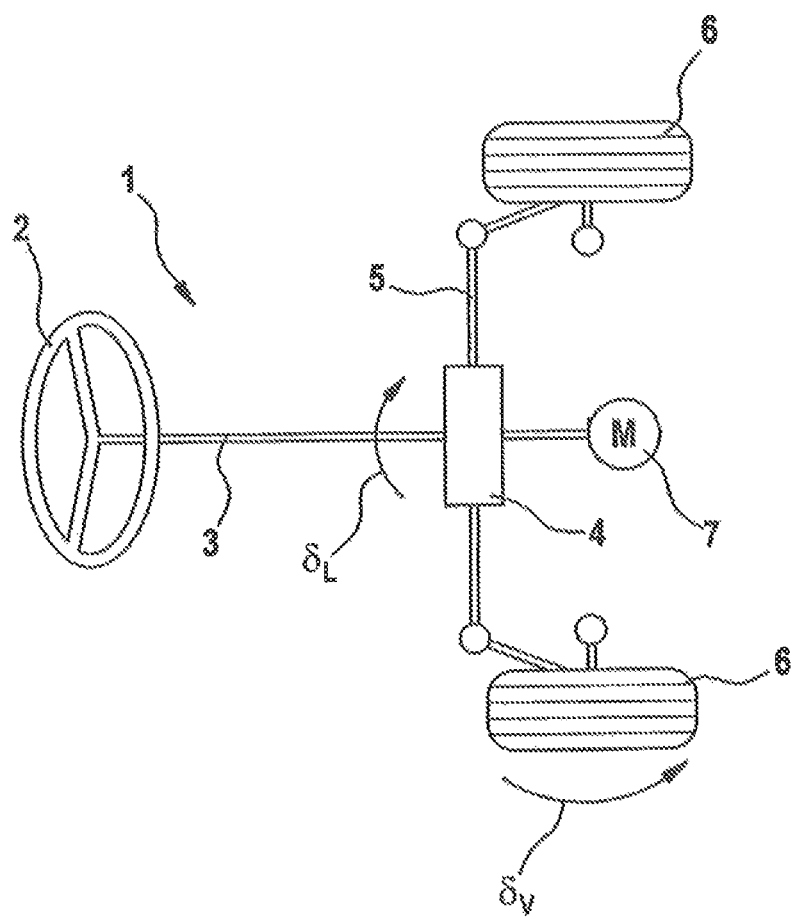
FIG. 1 is a schematic illustration of a steering system, in a vehicle, that is equipped with an electrical servo motor for steering assistance.

In the figures, identical components are denoted by the same reference numerals.

FIG. 1 shows an electromechanical steering system 1 for a vehicle, comprising a steering wheel 2, a steering column 3, a steering housing 4 having a steering gear accommodated therein, and a steering linkage 5 for transmitting the steering motion to the steerable wheels 6 of the vehicle. Via the steering wheel 2, the driver can predefine a steering angle $\sigma_L$ which is converted into a wheel steering angle $\sigma_V$ of the steerable wheels 6 via the steering gear in the steering housing 4, which comprises a toothed rack, and the steering linkage 5.

To support the steering function, an electrical servo motor 7 that is coupled to the toothed rack in the steering housing 4 is disposed in the steering system 1. If needed, the electrical servo motor 7 is actuated so as to feed a supporting servo torque into the steering system 1, which acts to support the manual torque applied by the driver.

Figure 2:
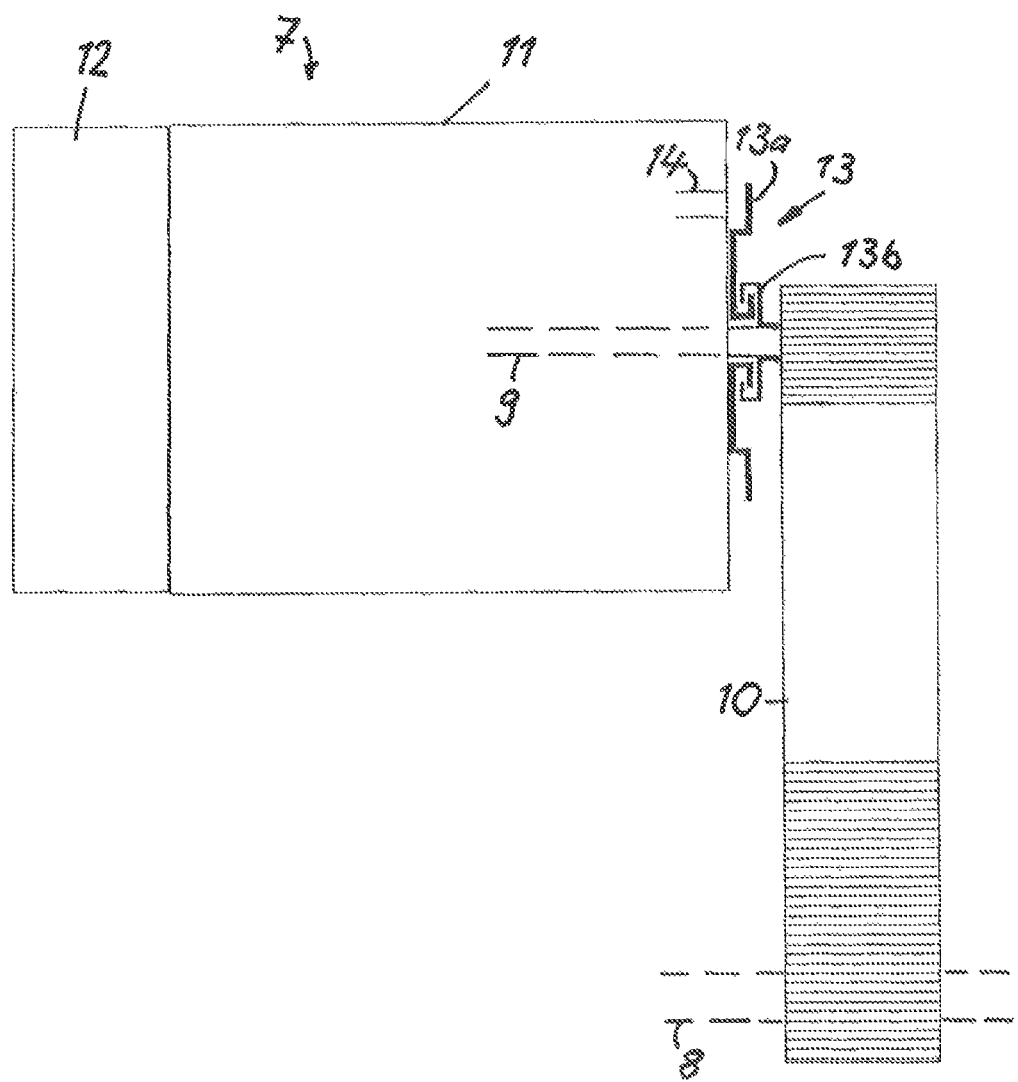
FIG. 2 shows the electrical servo motor comprising a flange-mounted control electronics unit and a two-piece water protection shield in the region of the motor shaft exiting the motor housing.

FIG. 2 shows the electrical servo motor 7, the motor shaft 9 of which is coupled via a transmission belt 10 to the toothed rack 8, which is rotatably mounted in the steering housing. As the remaining electrical components of the servo motor, the motor shaft 9 is accommodated in a motor housing 11, where it is rotatably mounted. On the side located opposite the section of the motor shaft 9 protruding from the motor housing 11, a control electronics unit 12, via which the electrical servo motor is controlled and which can be an integral part of a control unit, is flange-mounted to the motor housing 11.

A two-piece water protection shield 13, which comprises a first component 13a, which is connected to the motor housing 11, and a second component 13b, which is non-rotatably connected to the motor shaft 9 in the region of the section protruding from the motor housing 11, is located between the motor housing 11 and the transmission belt 10. The two components 13a, 13b of the water protection shield 13 cooperate in the manner of a labyrinth seal, prevent water or water creepage from being able to flow axially along the outer casing of the motor shaft 9 into the interior of the motor housing 11, and prevent water droplets from reaching the region of the motor housing end face facing the belt 10. The two components 13a, 13b of the water protection shield are both disk-shaped; the first component 13a on the motor housing side having a larger diameter than the second component 13b on the motor shaft side.

A venting bore 14 is introduced in the end face of the motor housing 11 facing the belt 10 and is used to reduce any installation-induced overpressure in the interior of the motor housing 11 when the servo motor is installed, and more particularly, when the control electronics unit 12 is attached. In order to prevent water droplets from reaching the interior of the motor housing via the venting bore 14, the housing-side component 13a of the water protection shield 13 extends in the radial direction, relative to the longitudinal motor shaft axis, such a distance along the end face of the motor housing 11 that the venting bore 14 is covered.

The two components 13a, 13b together form a labyrinth seal, which reliably prevents undesirable transfer of water into the interior of the motor housing. Component 13b on the motor shaft side has a larger axial distance with respect to the end face of the motor housing 11 than component 13a on the housing side, which is advantageously directly fastened to the end face of the motor housing. The labyrinth seal is implemented by providing the first component 13a on the motor housing side with a peripheral water collection groove that is open outwardly in a radial direction and is adjacent to the motor shaft 9, the groove being delimited on the second side facing the shaft-side component 13b by a radial wall over which an associated section of the second, shaft-side section of the component 13b is fitted. The overlapping section on the shaft-side component 13b assures that water droplets, which are, for example, delivered via the revolving transmission belt 10 in the direction of the motor shaft, reach the water collection groove on the housing-side component 13a. Water droplets that reach the region of the end face of component 13a on the motor housing side flow into the water collection groove, where they can either be discharged downward following the force of gravity or evaporate over time.

LIST OF REFERENCE NUMERALS 1 steering system
2 steering wheel
3 steering column
4 steering housing
5 steering linkage
6 front wheel
7 electrical servo motor
8 toothed rack
9 motor shaft
10 transmission belt
11 motor housing
12 control electronics unit
13 water protection shield
13a component
13b component
14 venting bore

The invention claimed is:

1. A steering system in a vehicle, comprising:
an electrical servo motor for generating a supporting servo torque, a motor shaft of the servo motor being coupled to a motion-transmitting component of the steering system, and
a water protection shield enclosing the motor shaft is disposed between a motor housing of the servo motor and the motion-transmitting component; and
wherein the water protection shield covers at least one venting bore in the motor housing.

2. A steering system according to claim 1, wherein a control electronics unit for controlling the servo motor is disposed on the motor housing.

3. The steering system according to claim 2, wherein the control electronics unit is disposed on the side of the motor housing facing away from the water protection shield.

4. A steering system according to claim 1, wherein the motor shaft is coupled to a component of the steering system via a transmission belt.

5. A steering system according to claim 1, wherein at least one component of the water protection shield is designed as a plastic part.

6. A steering system according to claim 1, wherein at least one component of the water protection shield is designed as a sheet metal part.

7. A steering system in a vehicle, comprising:
- an electrical servo motor for generating a supporting servo torque, a motor shaft of the servo motor being coupled to a motion-transmitting component of the steering system; and
- a water protection shield enclosing the motor shaft is disposed between a motor housing of the servo motor and the motion-transmitting component; and
- wherein at least one component of the water protection shield is disposed non-rotatably on the motor shaft;
- wherein at least one component of the water protection shield is rigidly connected to the motor shaft;
- wherein the components of the water protection shield on the motor shaft or on the motor housing cooperate in a manner of a labyrinth seal; and
- wherein the water protection shield covers at least one venting bore in the motor housing.

\* \* \* \* \*